2,716,965

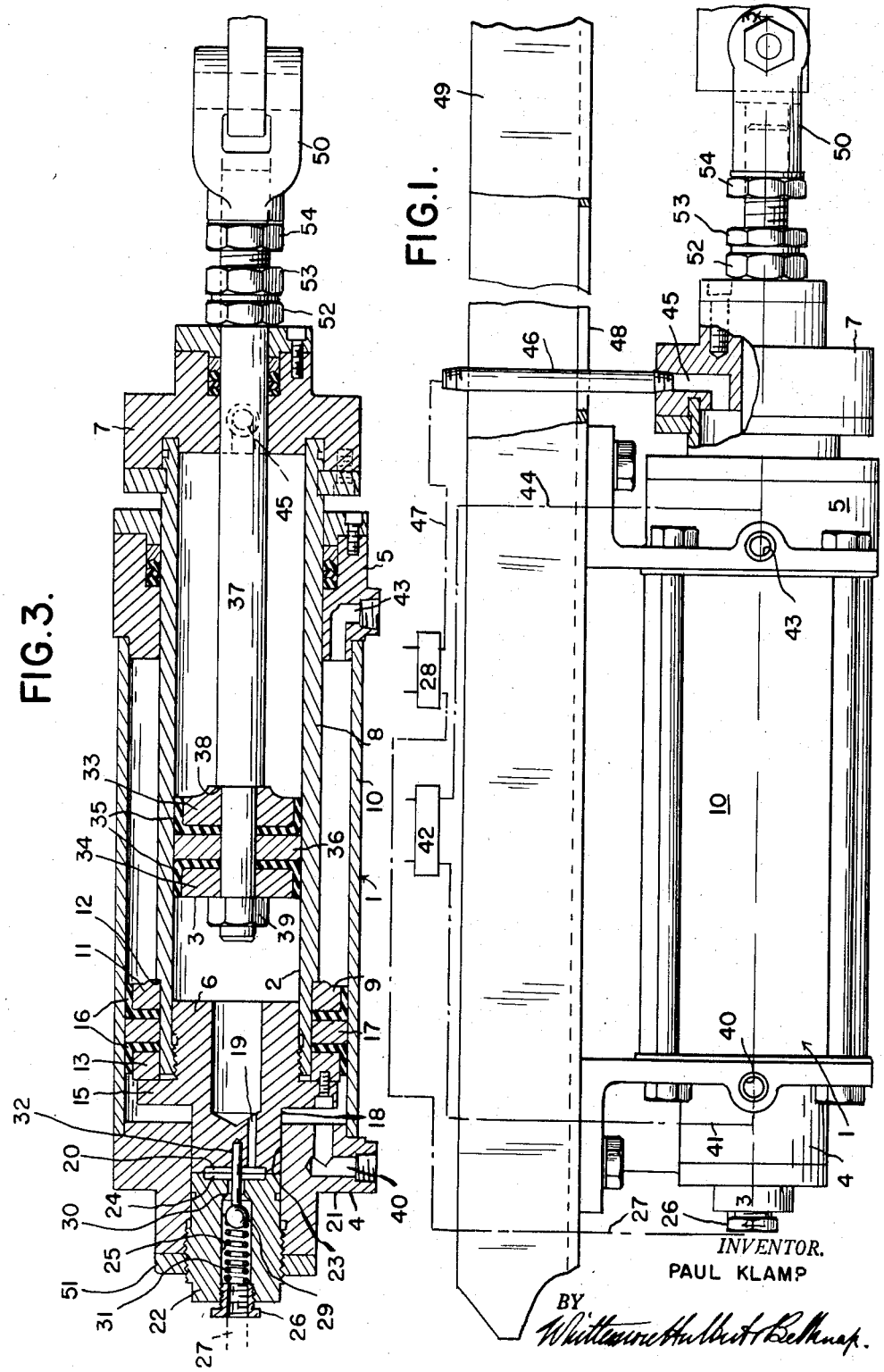
Sept. 6, 1955
P. KLAMP
FLUID PRESSURE ACTUATED DEVICE HAVING
A NUMBER OF PREDETERMINED POSITIONS
Filed Dec. 3, 1951
2,716,965
2 Sheets-Sheet 1
INVENTOR.
PAUL KLAMP
BY
ATTORNEYS Sept. 6, 1955  P. KLAMP  2,716,965
FLUID PRESSURE ACTUATED DEVICE HAVING
A NUMBER OF PREDETERMINED POSITIONS
Filed Dec. 3, 1951  2 Sheets-Sheet 2
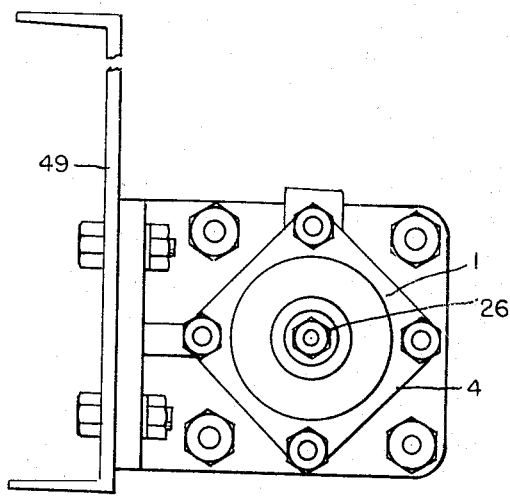
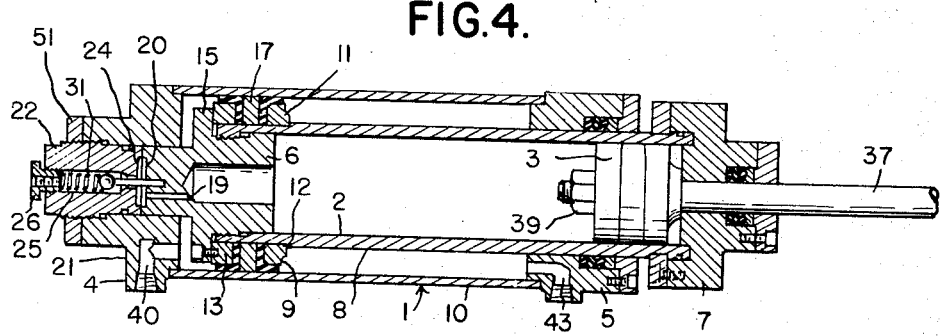
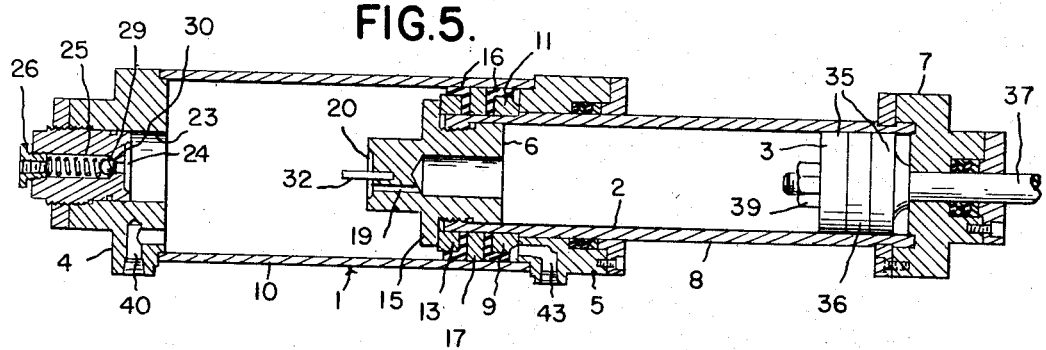
INVENTOR.
PAUL KLAMP
BY
ATTORNEYS United States Patent Office 2,716,965
Patented Sept. 6, 1955

FLUID PRESSURE ACTUATED DEVICE HAVING A NUMBER OF PREDETERMINED POSITIONS

Paul Klamp, Detroit, Mich., assignor to Mechanical Handling Systems Inc., Detroit, Mich., a corporation of Michigan Application December 3, 1951, Serial No. 259,666

12 Claims. (Cl. 121—38)

The invention relates to fluid pressure actuated devices and refers more particularly to devices adapted to be actuated by fluid under pressure and having a force transmitting or work operating member movable to a number of positions including an intermediate position.

The invention has for one of its objects to provide an improved fluid pressure actuating device which is efficient in operation and simple and compact in construction.

The invention has for another object to provide a fluid pressure actuated device having readily accessible external adjustments for accurately locating the various positions of the work operating member.

The invention has for a further object to provide a fluid pressure actuated device requiring only one flexible connection for fluid under pressure.

With these and other objects in view, the invention resides in the novel features of construction and combinations and arrangements of parts as more fully hereinafter set forth.

In the drawings:

Figure 1 is a plan view partly in section of a fluid pressure actuated device embodying the invention;

Figure 2 is an end view thereof;

Figure 3 is a cross section on the line 3—3 of Figure 1;

Figures 4 and 5 are views similar to Figure 3 showing the positions of the parts in the various positions of adjustment of the force transmitting or work operating member.

The fluid pressure actuated device as illustrated in Figures 1-5 inclusive comprises the cylinder 1, the combined cylinder and piston 2 reciprocable within the cylinder 1 and the piston 3 reciprocable within the combined cylinder and piston 2. The cylinder 1 has at its ends the rear and front heads 4 and 5 respectively. The combined cylinder and piston 2 has at its rear and front ends the heads 6 and 7 respectively, the head 6 being inside the cylinder 1 and the head 7 being outside the cylinder 1. 8 is the cylinder proper of the combined cylinder and piston and 9 is the piston proper secured upon the rear end of the cylinder proper 8 and slidably engaging the cylinder proper 10 of the cylinder 1. The piston has the front collar 11 clamped against the annular shoulder 12 of the cylinder proper 8 by suitable means including the collar 13 and the bolts 14 which abut the collar 13 and are threaded in the annular radial flange 15 of the inside head 6. 16 are flexible seals of the piston clamped between the collars 11 and 13 and the intermediate collar 17.

The inside or rear head 6 of the combined cylinder and piston 2 has the reduced cylindrical projection 18 extending axially rearwardly and abutting the rear head 4 of the cylinder 1 in the retracted or rearmost position of the combined cylinder and piston 2. The projection is provided with the longitudinally extending port 19 for the passage of fluid under pressure. The rear end of the projection is also provided with the circular recess 20 into which the port 19 opens. In the present instance the rear head 4 comprises the radially outer and inner members 21 and 22, the outer member having the central axially extending bore 23 into which the inner member 22 extends. As a result, the portion of the bore forward of the inner member is a cylindrical chamber which is of a size to slidably receive the projection 18. The inner member 22 has in its front face the circular recess 24 registering and communicating with the circular recess 20 and the inner member is also provided with the axial port 25 for the passage of fluid under pressure in communication with the circular recess 24 and connected by the bushing 26 and the tubing 27 to the four-way valve 28 which is of conventional construction and is connected to a suitable source of fluid under pressure such as compressed air. 29 is a ball valve normally urged forwardly toward the valve seat 30 of the port 25 by the coil spring 31 which is located between the ball valve and the bushing 26. This ball valve is held off its seat in the retracted or rearmost position of the combined cylinder and piston 2, as shown in Figure 3, by means of the push pin 32 secured to the projection 18 and extending axially rearwardly therefrom to engage the ball valve.

The piston 3 is formed of the front collar 33, the rear collar 34, the seals 35 slidably engaging the cylinder proper 8 and the intermediate collar 36. These collars are mounted on the piston rod 37 which extends forwardly through the head 7. The collar 33 is held against the annular shoulder 38 of the piston rod by means of the nut 39 threaded on the piston rod and the intermediate parts of the piston.

The rear head 4 of the cylinder 1 is provided with the port 40 for the passage of fluid under pressure, this port being connected by the tubing 41 to the four-way valve 42 which is of the same construction as the four-way valve 28 and is also connected to a suitable source of fluid under pressure such as compressed air. The port 40 communicates with the interior of the cylinder proper 10 radially outwardly of the projection 18 and in rear of the piston 9. The front head 5 of the cylinder 1 is provided with the port 43 for the passage of fluid under pressure communicating with the interior of the cylinder proper 10 and connected to the four-way valve 42 by the tubing 44. The front head 7 of the combined cylinder and piston 2 is provided with the port 45 for the passage of fluid under pressure in communication with the cylinder proper 8. This port is connected to the four-way valve 28 by the tube 46 which is fixed to the head 7 and the flexible tubing 47 between the tube and the four-way valve. The tube is fixed to the head 7 and slidably engages and is guided by the edges of the slot 48 in the support 49 for the fluid pressure actuated device, the slot being parallel to the axis of the device and its edges holding the combined cylinder and piston from rotation.

For accurately locating the various relative positions of the force transmitting or work operating member 50 which is connected to the force transmitting piston rod 37, the positions at the ends of the strokes of the combined cylinder and piston 2 and the piston 3 are accurately determined. Also the position of the force transmitting or work operating member upon the piston rod is accurately determined.

In detail, the limit of forward movement of the combined cylinder and piston 2 is determined by abutment of the front collar 11 with the front head 5 and the limit of rearward movement of the combined cylinder and piston is determined by abutment of the projection 18 with the inner member 22 of the rear head 4. This inner member is in the nature of a plug threaded into the outer member 21 and having opposite flats at its rear end for engagement by a suitable wrench to rotatably adjust the plug. The plug is adapted to be locked in its rotative position of adjustment by the lock nut 51 threaded upon the plug and abutting the rear end of the outer member 21. The forward movement of the piston 3 is limited by abutment of the front collar 33 with the front head 7 of the combined cylinder and piston 2. The rearward movement is limited by means of the nut 52 adjustably threaded upon the piston rod 37 and abutting the front face of the front head 7. This nut is locked in its position of adjustment by means of the lock nut 53 which is also threaded on the piston rod and which abuts the nut. The work operating member 50 is in the nature of a clevis adjustably threaded on the piston rod 37 and adapted to be locked in its position of adjustment by means of the lock nut 54 which is threaded on the piston rod and abuts the rear end of the hub of the clevis. It will thus be seen that the relative positions at the ends of the strokes of the combined cylinder and piston 2 and the piston 3 and the position of the work operating member 50 upon the piston rod 37 can be varied by readily accessible external adjustments to thereby accurately locate the various relative positions of the work operating member during the operation of the fluid pressure actuating device.

In operation, assuming the combined cylinder and piston 2 and the piston 3 and rod 37 are in their rearmost positions, as shown in Figure 3, with the portions of the cylinder proper 10 and of the cylinder proper 8 forwardly of the pistons 9 and 3 filled with air under pressure and the projection 18 of the head 6 abutting and forming a seal with the inner member 22 of the rear head 4 and the ball valve 29 in open position, the valve 28 is operated to open the port 45 in the front head 7 to exhaust and to open the port 25 in the inner member 22 of the rear head 4 to air under pressure. The air under pressure passes through the recesses 24 and 20 and the port 19 in the rear head 6 and acts upon the rear face of the piston 3 to advance it and the rod 37 and clevis 50 until the piston abuts the front head 7. The position of the parts at this time is illustrated in Figure 4, it being noted that the portion of the cylinder 1 in advance of the piston 9 is filled with air under pressure while the port 40 of the rear head 4 is open to exhaust as controlled by the valve 42.

To secure the next position as illustrated in Figure 5 the port 43 of the front head 5 is opened to exhaust and the port 40 of the rear head 4 is opened to air under pressure by operation of the valve 42 and this air advances the combined cylinder and piston 2 until the piston 9 abuts the front head 5. During the first portion of the advancement the ball valve 29 is allowed to seat after which the port 19 in the rear head 6 is subject to the pressure of air entering through the port 40 so that pressure of air in the rear portion of the cylinder proper 8 in rear of the piston 3 is the same as that in the rear portion of the cylinder proper 10 in rear of the piston 9.

To return the parts to the positions shown in Figure 4, the valve 42 is operated to open the port 43 to air under pressure and the port 40 to exhaust at which time the portion of the cylinder proper 8 in rear of the piston 3 is also open to exhaust but the piston 3 is held against the head 7 by reason of the resistance offered by the work connected to the clevis 50. During the final portion of the return movement of the combined cylinder and piston 2, the projection 18 through the pin 32 unseats the ball valve 29 and the end of the projection engages and forms a seal with the inner member 22 of the rear head. As soon as the ball valve 29 is moved to open position, the rear face of the piston 3 is exposed to air under pressure.

To secure the positions of the parts illustrated in Figure 1 the valve 28 is operated to open the port 25 to exhaust and to open the port 45 to air under pressure. This air under pressure acting upon the piston 3 moves the piston and the rod 37 and clevis 50 rearwardly until the nut 52 abuts the head 7.

With the above construction the force transmitting or work operating member of the fluid pressure actuated device is movable to three predetermined positions. Also the fluid pressure actuated device may be readily adjusted to accurately locate the positions of the force transmitting or work operating member. Furthermore the fluid pressure actuated device has only one flexible connection.

What I claim as my invention is:

1. A fluid pressure actuated device comprising a cylinder having front and rear heads at its ends, a combined cylinder and piston reciprocable within said cylinder and having at its ends a rear head inside and a front head outside said cylinder, said inside head being provided with a reduced axially extending portion abutting said first mentioned rear head in the rearward position of said combined cylinder and piston and having a port, said first mentioned rear head having outer and inner members with said outer member provided with a port in communication with said cylinder radially outwardly of said reduced portion and said inner member adjustably mounted on said outer member and forming an adjustable abutment for said reduced portion, said inner member having a port in communication with the port in said reduced portion, a valve in the inner member port, means on said reduced portion for holding said valve open in the rearward position of said combined cylinder and piston, said front heads of said cylinder and combined cylinder and piston being provided with ports, and a piston reciprocable within said combined cylinder and piston.

2. A fluid pressure actuated device comprising a cylinder having front and rear heads at its ends, said rear head having an outer member and an inner member adjustable axially of said outer member, a combined cylinder and piston reciprocable within said cylinder and having at its ends a rear head inside and a front head outside said cylinder, said inside head being provided with a reduced axially extending portion abutting and forming a seal with said inner member in the rearward position of said combined cylinder and piston and having a port, said outer member having a port in communication with said cylinder radially outwardly of said reduced portion and said inner member having a port in communication with the port in said reduced portion, a valve in the port of said inner member, means on said reduced portion for holding said valve open in the rearward position of said combined cylinder and piston, said front heads of said cylinder and combined cylinder and piston being provided with ports, a piston reciprocable within said combined cylinder and piston, a rod secured to said piston and extending through said outside head, an adjustable abutment member upon said rod engageable with said outside head and a force transmitting member adjustably connected to said rod.

3. A fluid pressure actuated device comprising a cylinder having front and rear heads at its ends, a combined cylinder and piston reciprocable within said cylinder and having at its ends a head inside and a head outside said cylinder, said inside head being provided with a reduced axially extending portion abutting said first mentioned rear head in the rearward position of said combined cylinder and piston and having a port, said first mentioned rear head having a port in communication with said cylinder radially outwardly of said reduced portion and a valve controlled port in communication with the port in said reduced portion in the rearward position of said combined cylinder and piston, a valve in the valve controlled port, means on said reduced portion for holding said valve open when said combined cylinder and piston is in rearward position, said front heads of said cylinder and combined cylinder and piston being provided with ports and a piston reciprocable within said combined cylinder and piston.

4. A fluid pressure actuated device comprising a cylinder having front and rear heads at its ends, a combined cylinder and piston reciprocable within said cylinder and having front and rear heads at its ends, said rear head of said combined cylinder and piston having an abutment with said rear head of said cylinder in the rearward position of said combined cylinder and piston, said front and rear heads of said combined cylinder and piston having ports, said front head of said cylinder having a port, said rear head of said cylinder having a port opening into said cylinder radially outwardly of the abutment between said rear heads and also having a port radially inwardly of the abutment between said rear heads, a piston reciprocable within said combined cylinder and piston, a rod secured to said piston and extending through said front head of said combined cylinder and piston, said front heads of said cylinder and combined cylinder and piston forming abutments respectively for said combined cylinder and piston and said piston to limit the forward movements thereof, externally adjustable means on said rear head of said cylinder forming an adjustable abutment for said rear head of said combined cylinder and piston to limit rearward movement thereof, externally adjustable means on said rod forming an adjustable abutment engageable with said front head of said combined cylinder and piston to limit rearward movement of said piston and a force transmitting member adjustably connected to said rod.

5. A fluid pressure actuated device comprising a cylinder having front and rear heads at its ends, said rear head having a fixed member and a member adjustable axially of said fixed member, a combined cylinder and piston reciprocable within said first mentioned cylinder and having front and rear heads at its ends, said last mentioned rear head being inside said first mentioned cylinder and being provided with a reduced axially extending portion abutting and forming a seal with said adjustable member in the rearward position of said combined cylinder and piston, said reduced portion having a port, said fixed member having a port in communication with said first mentioned cylinder radially outwardly of said reduced portion and said adjustable member having a port in communication with the port in said reduced portion, a valve in the port of said adjustable member, means on said reduced portion for holding said valve open in the rearward position of said combined cylinder and piston, said front heads of said cylinder and combined cylinder and piston having ports, a piston reciprocable within said combined cylinder and piston, a rod secured to said piston and extending through said front head of said combined cylinder and piston, said front heads of said cylinder and combined cylinder and piston forming abutments for said combined cylinder and piston and said piston respectively in the forward positions thereof, an adjustable abutment member upon said rod engageable with said front head of said combined cylinder and piston in the rearward position of said piston and a force transmitting member adjustably connected to said rod.

6. A fluid pressure actuated device comprising a cylinder having front and rear heads at its ends, a combined cylinder and piston reciprocable within said cylinder and having front and rear heads at its ends, said last mentioned rear head being inside said cylinder, said last mentioned rear head being provided with an abutment portion abutting said first mentioned rear head in the rearward position of said combined cylinder and piston and having a port, said front head of said combined cylinder and piston having a port for the passage of fluid under pressure, said front head of said cylinder having a port for the passage of fluid under pressure, said rear head of said cylinder having a first port in communication with the port in said abutment portion in the rearward position of said combined cylinder and piston and having a second port spaced radially outwardly of said abutment portion, a valve in said first port normally closing the latter, means on said abutment portion for holding said valve open when said combined cylinder and piston is in its rearward position, and a piston reciprocable within said combined cylinder and piston.

7. A fluid pressure actuated device comprising a cylinder having front and rear heads at its ends, a combined cylinder and piston reciprocable within said cylinder and having front and rear heads at its ends, said last mentioned rear head being inside said cylinder, said last mentioned rear head being provided with an abutment portion abutting said first mentioned rear head in the rearward position of said combined cylinder and piston and having a port, said front head of said combined cylinder and piston having a port for the passage of fluid under pressure, said front head of said cylinder having a port for the passage of fluid under pressure, said rear head of said cylinder having a first port in communication with the port in said abutment portion in the rearward position of said combined cylinder and piston and having a second port spaced radially outwardly of said abutment portion, and a piston reciprocable within said combined cylinder and piston.

8. The fluid pressure actuated device set forth in claim 7, having externally adjustable means on said rear head of said cylinder forming an adjustable abutment for said rear head of said combined cylinder and piston to limit the rearward movement thereof.

9. A fluid pressure actuated device comprising a cylinder having front and rear heads, a combined cylinder and piston reciprocable within said cylinder and having front and rear heads, a piston reciprocable within said combined cylinder and piston, said rear head of said combined cylinder and piston being within said cylinder and having an abutting relation with said rear head of said cylinder in the rearward position of said combined cylinder and piston, said rear head of said cylinder having a fixed member and an externally adjustable, axially shiftable member forming an adjustable abutment for said rear head of said combined cylinder and piston to limit the rearward movement thereof, a port in said adjustable abutment, said rear head of said combined cylinder and piston having an abutment portion for abutting said adjustable abutment in the rearward position of said combined cylinder and piston and a port in said abutment portion communicating with the port in said adjustable abutment in the rearward position of said combined cylinder and piston.

10. The fluid pressure actuated device set forth in claim 9 having a valve for one of said ports normally closing said one port, and means on the rear head having the other port for holding said valve open when said combined cylinder and piston is in its rearward position.

11. A fluid pressure actuated device comprising a cylinder having front and rear heads at its ends, a combined cylinder and piston reciprocable within said cylinder and having front and rear heads at its ends, said last mentioned rear head being inside said cylinder, said last mentioned rear head being provided with an abutment portion abutting said first mentioned rear head in the rearward position of said combined cylinder and piston and having a port, said rear head of said cylinder having a port in communication with the port in said abutment portion in the rearward position of said combined cylinder and piston, a valve for one of said ports normally closing said one port, means on the rear head having the other port for holding said valve open when said combined cylinder and piston is in its rearward position, and a piston reciprocable within said combined cylinder and piston.

12. A fluid pressure actuated device comprising a cylinder having front and rear heads at its ends, a combined cylinder and piston reciprocable within said cylinder and having front and rear heads at its ends, said last mentioned rear head being inside said cylinder, said last mentioned rear head being provided with an abutment portion abutting said first mentioned rear head in the rearward position of said combined cylinder and piston and having a port, said rear head of said cylinder having a port in communication with the port in said abutment portion in the rearward position of said combined cylinder and piston, the rear head of said cylinder having another port therein spaced radially of said abutment portion, and a piston reciprocable within said combined cylinder and piston.

References Cited in the file of this patent

UNITED STATES PATENTS

| | | |
|---|---|---|
| 501,426 | Kampf | July 11, 1893 |
| 1,963,286 | Ballert | June 19, 1934 |
| 2,314,041 | Gurries | Mar. 16, 1943 |
| 2,334,323 | Gilbert | Nov. 16, 1943 |
| 2,397,106 | Haller | Mar. 26, 1946 |
| 2,510,314 | Jirsa | June 6, 1950 |
| 2,636,233 | Perkon | Apr. 28, 1953 |

FOREIGN PATENTS

| | | |
|---|---|---|
| 575,910 | Great Britain | Mar. 11, 1946 |
| 993,143 | France | July 18, 1951 |